United States Patent [19]

Herman et al.

[11] Patent Number: 5,395,149
[45] Date of Patent: Mar. 7, 1995

[54] DEVICE FOR HOLDING AN OBJECT ONTO A SUPPORT AND SUBSEQUENTLY SEPARATING IT THEREFROM IN A CONTROLLED SEQUENCE

[75] Inventors: Philippe Herman, Saint Medard en Jalles; Jean-Luc Pavec, Margaux, both of France

[73] Assignee: Aerospatiale Societe Nationale Industrielle, France

[21] Appl. No.: 143,936

[22] Filed: Oct. 27, 1993

[30] Foreign Application Priority Data

Nov. 9, 1992 [FR]  France ............................. 92 13468

[51] Int. Cl.⁶ ............................................. B64D 1/12
[52] U.S. Cl. ................................ 294/82.26; 244/137.4; 244/158 R; 294/82.29
[58] Field of Search .................. 294/82.24–82.26, 294/82.29, 82.3, 82.32, 82.36, 88; 244/137.1, 137.4, 158 R, 161

[56] References Cited

U.S. PATENT DOCUMENTS

| | | | |
|---|---|---|---|
| 2,888,294 | 5/1959 | Savarieau | 294/82.26 |
| 3,010,752 | 11/1961 | Geffner | 294/82.29 X |
| 3,196,745 | 7/1965 | Sustrich . | |
| 3,756,545 | 9/1973 | Coutin | 244/137.4 |
| 3,887,150 | 6/1975 | Jakubowski | 244/137.4 |
| 4,187,760 | 2/1980 | Holt . | |
| 4,257,639 | 3/1981 | Stock | 294/82.26 |
| 4,964,595 | 10/1990 | Nordhaus | 244/137.4 |

FOREIGN PATENT DOCUMENTS

| | | |
|---|---|---|
| 0363242 | 4/1990 | European Pat. Off. . |
| 0454564 | 10/1991 | European Pat. Off. . |
| 2616856 | 12/1988 | France . |

*Primary Examiner*—Johnny D. Cherry
*Attorney, Agent, or Firm*—Remy J. VanOphem; John VanOphem

[57] ABSTRACT

A device for retaining an object to a support and then separating it therefrom in a controlled sequence embodying a receptacle to be fixed to the support, a chimney fixed to the receptacle and a retaining sleeve adapted to couple a bearing surface of the object to a bearing surface of the receptacle or to release it. A piston slides along the chimney and has a locking configuration in which it holds the retaining sleeve in place and a release configuration. An ejector piston slides in the chimney to eject the object. Drive pressure operates first on the piston until it can operate on the ejector piston at the end of the movement of the piston.

9 Claims, 2 Drawing Sheets

DEVICE FOR HOLDING AN OBJECT ONTO A SUPPORT AND SUBSEQUENTLY SEPARATING IT THEREFROM IN A CONTROLLED SEQUENCE

BACKGROUND OF THE INVENTION

1. Field of the Invention

The invention concerns the temporary attachment of an object to a support, the quick release of the object and then its controlled ejection in a predetermined direction.

It finds an advantageous but by no means exclusive application in spacecraft and in particular in satellites, for example for deploying microsatellites from a launch vehicle or a larger satellite. The invention is equally applicable to various terrestrial, maritime (surface and underwater craft) and airborne (aircraft of all kinds) vehicles in which a temporary attachment is to be released at a given time with prompt and accurate movement of the object in question (for example to launch it without external guidance).

Thus applications of the invention include the conduct of scientific experiments in the upper reaches of the terrestrial atmosphere and the exploration of planets in the solar system from an automatic probe. It can be used to eject a storage tank containing a chemical substance to serve as a tracing agent for wind or magnetic field studies, for example. A storage tank of this kind can be ejected from an artificial platform such as a sounding rocket or an interplanetary probe.

2. Description of the Prior Art

Various mechanisms for achieving temporary attachment followed by quick separation and ejection to obtain clean separation between the object and its support are already known.

The following documents may be mentioned in this regard: U.S. Pat. Nos. 4,554,905, 3,887,150, 2,888,294, 3,196,745, 3,597,919, 4,002,120, 4,187,759 and International application WO 82/02527.

In practice these documents propose the use of presure type energy to bring about unlocking or separation. This energy may be pneumatic, hydraulic or pyrotechnic, for example. In the particularly important case of pyrotechnic energy, the process relies on the pneumatic effects of detonating an explosive.

Pyrotechnic energy is also used in separator devices of the following types: explosive bolts, explosive cutters and pyrotechnic release systems which retract an abutment. They are usually associated with separator pistons.

None of the above-mentioned documents concerns itself significantly with the subsequent movement of the object.

French Patent No. 2,616,856 concerns a mechanism for commanding the separation of a part from a support with which it is initially in contact and with the speed and acceleration of ejection under total control. This patent teaches the interposition of a spring or gas type elastic member between a drive member and the piston in order to apply a clearly defined quantity of energy to the object to be ejected.

French Patent No. 2,661,465 is directed to a device for temporary mechanical attachment and quick separation of an object and a support. This patent teaches that to accurately control the magnitude and direction of the ejection speed the ejector rod should contact the object to be ejected near its center of mass and the receptacle in which the ejector rod slides should be fixed to the object near the opening of a housing provided in the object to provide access to its center of gravity for the ejector rod. Centering areas are provided in the object near the contact area and the opening, respectively.

European Patent No. 0,363,242 concerns a device for temporarily attaching/detaching two members and subsequently separating them. To enable a plurality of attachment and detachment cycles, the device embodies in a hollow body fastened to one member a retaining sleeve adapted to retract radially onto a male member connected to the other member or to move away from the male member to release it. A piston slides in the hollow body and collaborates with a case sliding on the piston and on the sleeve to maneuver the retaining sleeve between its two configurations. An ejector finger is fixed to the inside of the sliding piston by a member adapted to be easily broken. When a pyrotechnic charge is detonated the resulting high pressure operates on the sliding piston and on the case to retract the retaining sleeve and on the ejector finger to apply a thrust to the male member as soon as the member adapted to break easily is broken.

These latter solutions have proved and continue to prove satisfactory.

Nevertheless, in devices of this kind which have a three-fold retain/release/eject function the invention is directed to improved control of the release/ejection sequence to guarantee that release is completed when the ejection thrust is applied. This is to eliminate any unwanted repercussions of the release operation on the quality of ejection.

Strictly speaking, in the device of European Patent No. 0,363,242 the release and ejection operations are not staggered in time as the ejector finger can apply its thrust to the male member before the latter is entirely released or after it is released, depending on the strength of the member adapted to be readily broken and the conditions under which detonation occurs. In the device of French Patent No. 2,661,465 it is the ejection thrust which ruptures the fragile link and therefore brings about release. Finally, in the device of French Patent No. 2,616,856 the elastic member through which the thrust applied to the drive member is transmitted to the ejection piston sometimes achieves a damping of the thrust force and a time offset controlled to a greater or lesser degree and depending in particular on the prestressing (spring device) or pressure (gas device) of the elastic member, which may have diminished in storage because of aging or leaks.

An object of the invention is to provide a device having the three-fold function of temporarily retaining and then releasing and ejecting an object relative to a support in which the thrust phase takes place after the release phase, following a tightly controlled, non-null but possibly very small time interval (in the order of one millisecond compared with the usual time in the order of 8 to 15 seconds), and which is of simple and compact design and easy to operate.

SUMMARY OF THE INVENTION

The invention is a device for temporarily attaching an object to a support and for releasing and ejecting the object in a predetermined direction. According to the invention, the device embodies the following components.

A receptacle adapted to be fixed to the support and having an inside first wall elongate in the predetermined direction.

A retaining sleeve having a retaining configuration in which the object is coupled longitudinally to the support by cooperation of the retaining sleeve with retaining bearing surfaces respectively joined to the object and the support and a release configuration in which the retaining sleeve is transversely separated from at least facing bearing surfaces joined to the object or the support.

A chimney elongate in the predetermined direction defining with the first wall an annular housing and surrounding a central space elongate in this direction and having an open end near the retaining sleeve and a closed end, the central space communicating transversely with the annular housing through at least one orifice.

The device further includes a maneuvering piston having a tubular member sliding longitudinally in the annular housing and a transverse disk having a first thrust side bordering at the interior of the first wall a first pressure chamber adapted to communicate with a source of pressure. The maneuvering piston is mobile longitudinally between a locking configuration in which the tubular member holds the retaining sleeve transversely in its retaining configuration and a release configuration in which the tubular member releases the retaining sleeve so that it is free to assume its release configuration, the pressure in the first pressure chamber operating on the first thrust surface in a direction adapted to displace the maneuvering piston towards its release configuration.

The device also includes an ejector piston sliding longitudinally in the central space and constituting a second thrust side defining with the closed end of the central space a second pressure chamber, the pressure in which operates on the second thrust side in a direction adapted to apply an ejection thrust to the object.

According to the invention the chimney is fixed and has a solid portion isolating the orifice from the first pressure chamber when the maneuvering piston is in the locking configuration offset longitudinally from an open portion providing communication between the orifice and the first chamber when the maneuvering piston is in the release configuration.

Compared to French Patent No. 2,616,856, in particular with reference to the gas type of spring device, the pressure generated on detonation operates successively but directly on the tubular release piston and then on the ejector piston, which guarantees application of a steeper pressure front to the ejector piston than in the prior art document.

According to preferred features of the invention:
- the retaining sleeve is an annular plurality of sectors surrounding the bearing surfaces of the object and the support;
- the plurality of sectors and the bearing surfaces have screwthreads thereon;
- the transverse disk of the maneuvering piston is an annular flange projecting towards the interior of the tubular member and sliding along a longitudinal section extending from the closed end of the chimney opposite the object;
- a central chamber inside the longitudinal section is connected to the pressure source and communicates with the first pressure chamber through at least one orifice;
- the open portion is a thinner portion offset transversely relative to the chimney by a longitudinal distance at least equal to the longitudinal offset between the orifices of the second pressure chamber and the first pressure chamber;
- the first pressure chamber is transversely exterior to the tubular member and the open portion is composed of through-holes;
- a pin is fixed transversely to the receptacle and passes through the tubular member of the maneuvering piston by means of a generally longitudinal opening, the chimney, and enters a generally longitudinal groove; and
- the generally longitudinal groove is helical.

Objects, features and advantages of the invention will emerge from the following description given by way of non-limiting example with reference to the appended drawings.

DETAILED DESCRIPTION OF THE PREFERRED EMBODIMENT

Figure 1:
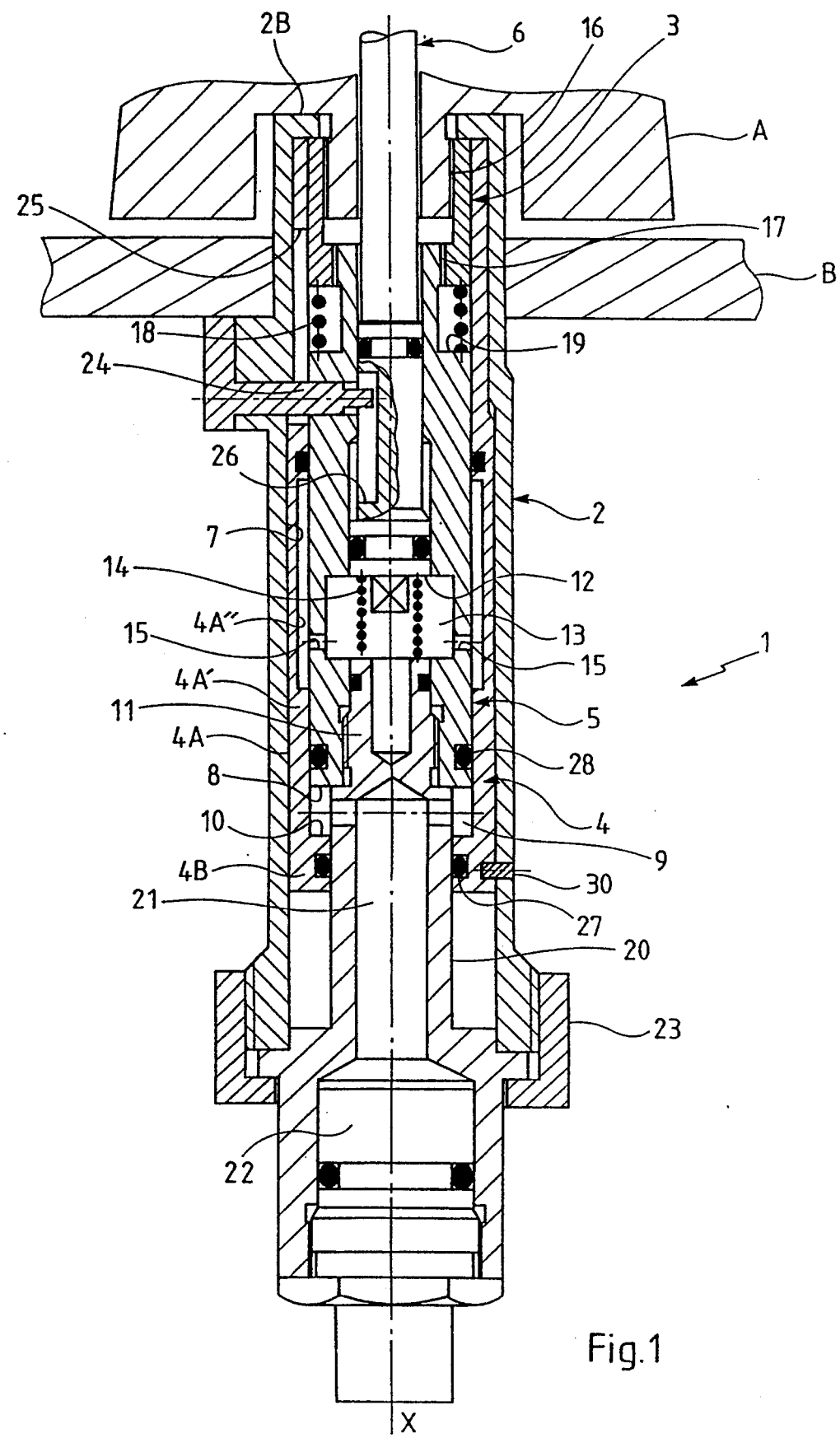
FIG. 1 is a view in axial cross section of a device in accordance with the invention in a retaining configuration.
Figure 2:
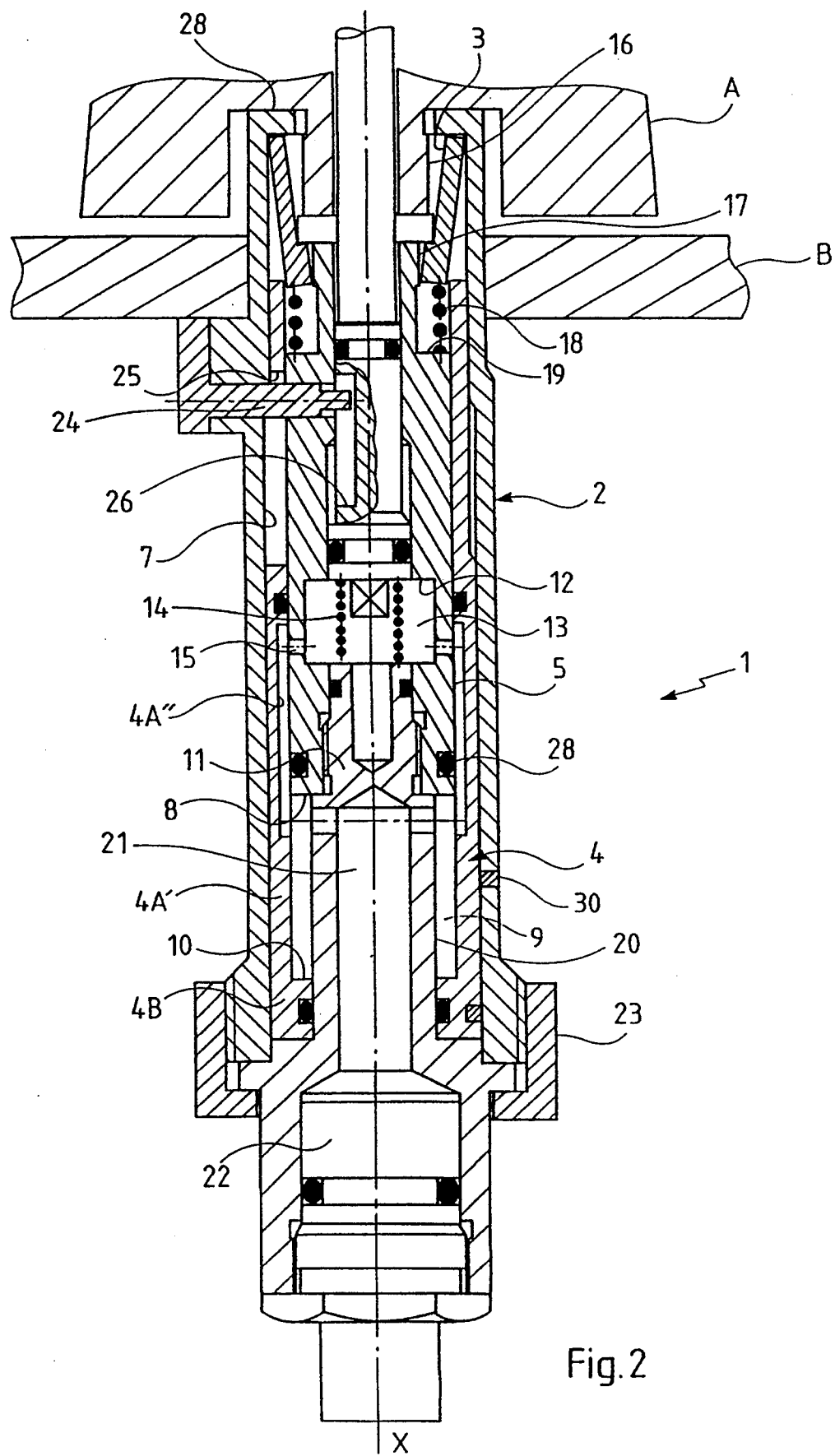
FIG. 2 is a view in axial cross section of the same device in a release configuration just prior to ejection.

FIGS. 1 and 2 show a device 1 adapted to retain an object A temporarily onto a support B and then, in response to a triggered command, to release the object A and then eject in a direction X—X.

The device 1 essentially embodies a receptacle 2, a retaining sleeve 3, a maneuvering piston 4, a chimney 5 and an ejector piston 6.

In this example the receptacle 2 is a tubular body defining an internal wall 7 which is aligned along the direction X—X and delimits a housing for containing the other components. The receptacle 2 is fixed by any appropriate known means to the support B.

The chimney 5 is a tubular body also aligned along the direction X—X and disposed inside of the receptacle 2 so as to delimit with the internal wall 7 of the receptacle 2 a space in the form of two longitudinally offset housings joined by a transverse shoulder 8 and therefore having different dimensions transverse to the direction X—X. The transverse shoulder 8 is on the outside wall of the chimney 5 in this example. The shoulder could be on the internal wall 7 in a different embodiment (not shown). In this embodiment the shoulder is oriented away from the object A so that the annular housing nearest the object, called the first housing hereinafter, is narrower than the housing on the opposite side of the object to the first housing, called the second housing hereinafter.

The maneuvering piston 4 slides longitudinally in this space. It constitutes a longitudinal tubular member 4A in the first housing and occupying all of its transverse width and a transverse disk 4B disposed in the second housing and occupying all of its transverse width. The maneuvering piston, the internal wall 7 and the chimney 5 define a variable volume first pressure chamber 9, the transverse disk having a first thrust side 10 exposed to the pressure in the first pressure chamber.

The chimney internally defines a central space elongate in the direction X—X having an open end facing the object and a closed end 11.

The ejector piston 6 slides in this central space and has a thrust side 12 which, with the closed end 11, defines a second pressure chamber 13 inside the chimney 5. The ejector piston 6 has a piston rod adapted to apply an ejection thrust to the object when a pressure front enters the second chamber 13. The piston rod conventionally ends at an extremity (not shown) in contact with a bearing surface of the object A and near the center of mass of the object, for example. A spring 14 is advantageously provided between the ejector piston and the closed end of the chimney in order to prestress the object while it is retained.

The second pressure chamber 13 communicates with the first housing in the direction transverse to the direction X—X via at least one orifice 15.

The retaining sleeve 3 cooperates with adjacent bearing surfaces 16 and 17 joined to the object A and to the device 1/chimney 5, respectively. These bearing surfaces face each other in the longitudinal direction and the sleeve surrounds them. In a variant that is not shown the bearing surfaces either of the object or of the chimney are located transversely outside the retaining sleeve 3 (see previously mentioned French Patent No. 2,616,856, for example). The retaining sleeve 3 is a plurality (at least two, in practice three) of cylindrical sectors separated by longitudinal slots whereby the retaining sleeve 3 can assume a retaining configuration in which it is engaged with the bearing surfaces 16 and 17 and so procures longitudinal retention of the object A to the support B and a release configuration (see FIG. 2) in which the retaining sleeve is at least transversely separated from the bearing surfaces of the object or the device 1/chimney 5.

In a simple embodiment the bearing surfaces 16 and 17 are screwthreaded portions cooperating with a screwthread inside the retaining sleeve 3, for example.

The bearing surface 16 is preferably located on an end piece of the object A and the bearing surface 17 is preferably located proximate the open end of the chimney 5.

The tubular member 4A of the maneuvering piston 4 has a terminal portion at the end opposite the transverse disk 4B adapted to hold the retaining sleeve laterally against the bearing surfaces and thus in its retaining configuration.

The receptacle 2 has a transverse flange 2B facing the retaining sleeve in the longitudinal direction at the open end of its housing, i.e. near the object.

A spring 18 is compressed between a shoulder 19 of the chimney 5 and the retaining sleeve 3 so as to press it against the flange 2B of the receptacle 2. The spring 18 also urges the retaining sleeve towards its release configuration when the end of the tubular member 4A of the maneuvering piston is no longer confining the retaining sleeve (see FIG. 2).

The maneuvering piston 4 can slide longitudinally between a locking configuration (FIG. 1) in which its tubular member holds the retaining sleeve transversely in its retaining configuration and a release configuration in which the sleeve is free to retract (due to the action of the spring 18, in particular) into its release configuration.

The pressure in the first pressure chamber 9 acts on the first thrust side 10 of the maneuvering piston in a direction which moves the latter towards its release configuration.

The chimney 5 is advantageously fixed to the receptacle by a longitudinal section 20 extending the chimney from its closed end 11 on the side opposite the object. The second housing defined within the receptacle therefore has an annular shape.

In this example where the first thrust surface 10 of the maneuvering piston is transversely inside the tubular member 4A, the longitudinal section 20 advantageously embodies a central chamber 21 in which a detonator 22 fixed to the receptacle can generate a pressure front. The central chamber 21 communicates with the first pressure chamber 9 even when the latter has its minimum volume (the orifices enabling this communication are therefore located near the transverse shoulder 8).

For practical reasons, the tubular part of the chimney is screwed or otherwise secured to the end of the longitudinal section 20, providing the closed end 11, the longitudinal section in turn being fixed to the receptacle by a screwthreaded ring 23.

A pin 24 through the annular housing normally occupied by the tubular member 4A of the maneuvering piston is fixed to the receptacle passing through the tubular member by means of a generally longitudinal opening 25 through the tubular part of the chimney (and therefore contributing to its fixing) and entering the ejector piston by means of a generally longitudinal groove 26 which delimits a range of relative sliding movement for the maneuvering piston 4 and for the ejector piston 6. The opening 25 and the groove 26 may be helical in order to impart rotation to the object.

The tubular member 4A of the maneuvering piston 4 includes a solid portion 4A' isolating the orifices 15 from the first pressure chamber 9 when the maneuvering piston is in the locking configuration offset longitudinally from an open portion 4A" enabling the orifices 15 to communicate with the first pressure chamber when the maneuvering piston reaches its release configuration.

Seals 27 and 28 are disposed at each longitudinal end of the first pressure chamber 9.

The open portion 4A" is open internally (i.e. facing the chimney) over a longitudinal distance at least equal to the longitudinal gap between the orifices 15 and the first pressure chamber 9. The open portion extends all around the chimney. It would be sufficient for the open portion to extend over only a sector but communication might then be established more slowly and less unambiguously.

In a variant that is not shown if the pressure chamber were transverse to the exterior of the tubular member the open portion would incorporate orifices through all of the thickness of the tubular member (possibly with longitudinal steps).

In operation the object (a microsatellite, for example) is assembled and the retaining sleeve 3 is fitted. The retained object is prestressed by the springs 14 and 18.

When the detonator 22 is fired the hot gases emitted increase the pressure in the first pressure chamber 9. After an optional fragile pin 30 is broken the gas pushes the maneuvering piston 4 downwards which brings about in a synchronized automatic sequence:
  the release of the object; and
  at the end of travel (FIG. 2), communication between the first pressure chamber 9 and the second pressure chamber 13, so applying pressure to the ejector piston 6 and ejecting the microsatellite.

The pin 24 may impart a helical movement to the rod which is transmitted to the object by any appropriate means, possibly by friction alone.

It will be understood that this synchronized operation is achieved with a simple and compact device. It goes without saying that the foregoing description has been given by way of non-limiting example and that numerous variants may be suggested by one skilled in the art without departing from the scope of the invention. Specifically, the second housing in the receptacle may extend under the closed end of the chimney across the entire cross section of the receptacle, the chimney being fixed by radial fingers, for example.

The various members 3, 4, 5, 6 and 7 are advantageously cylindrical (circular cross section) but other shapes (polygonal shapes, for example) are also feasible.

There is claimed:

1. Device for temporarily attaching an object to a support and for releasing and ejecting said object in a predetermined direction, said device comprising:
    a receptacle fixed to said support, said receptacle having an inside first wall along said predetermined direction;
    a retaining sleeve having a retaining configuration in which said object is coupled longitudinally to said support by cooperation of said retaining sleeve with retaining bearing surfaces respectively joined to said object and said support and a release configuration in which said sleeve is transversely separated from at least facing bearing surfaces joined to said object of said support;
    a chimney elongate in said predetermined direction defining with said first wall an annular housing and surrounding a central space elongate in said predetermined direction and having an open end near said retaining sleeve and a closed end, said central space communicating transversely with said annular housing through at least one orifice;
    a maneuvering piston comprising a tubular member sliding longitudinally in said annular housing and a transverse disk having a first thrust side bordering at the interior of said first wall so as to define a first pressure chamber adapted to communicate with a source of pressure, said maneuvering piston being mobile longitudinally between a locking configuration in which said tubular member holds said retaining sleeve transversely in a retaining configuration and a release configuration in which said tubular member releases said retaining sleeve so that said retaining sleeve is free to assume its release configuration, the pressure in said first pressure chamber operating on said first thrust side in a direction adapted to displace said maneuvering piston towards said release configuration of said maneuvering piston; and
    an ejector piston sliding longitudinally in said central space and comprising a second thrust side defining with said closed end of said central space a second pressure chamber, the pressure in which operates on said second thrust side in a direction adapted to apply an ejection thrust to said object, in which device said chimney is fixed and comprises a solid portion isolating and sealing said at least one orifice from said first pressure chamber when said maneuvering piston is in said locking configuration offset longitudinally from an open portion providing communication between said at least one orifice and said first chamber when said maneuvering piston is in said release configuration of said maneuvering piston.

2. Device according to claim 1 wherein said retaining sleeve comprises an annular plurality of sectors surrounding said bearing surfaces of said object and said support.

3. Device according to claim 2 wherein said plurality of sectors and said bearing surfaces have screwthreads.

4. Device according to claim 1 wherein said transverse disk of said maneuvering piston is an annular flange projecting towards the interior of said tubular member and sliding along a longitudinal section extending from said closed end of said chimney opposite said object.

5. Device according to claim 4 wherein a central chamber inside said longitudinal section is connected to said pressure source and communicates with said first pressure chamber through said at least one orifice.

6. Device according to claim 4 wherein said open portion is a thinner portion offset transversely relative to said chimney by a longitudinal distance at least equal to the longitudinal offset between said at least one orifice of said second pressure chamber and said first pressure chamber.

7. Device according to claim 1 wherein said first pressure chamber is transversely exterior to said tubular member and said open portion comprises through-holes.

8. Device according to claim 1 wherein a pin is fixed transversely to said receptacle and passes through said tubular member of said maneuvering piston by means of a generally longitudinal opening in said chimney, and enters a generally longitudinal groove.

9. Device according to claim 8 wherein said generally longitudinal groove is helical.

* * * * *